United States Patent
Kato (10) Patent No.: US 8,134,784 B2
(45) Date of Patent: Mar. 13, 2012

(54) LENS APPARATUS CAPABLE OF PERFORMING EXTENSION/RETRACTION OPERATION WITH RESPECT TO IMAGE PICKUP APPARATUS BODY AND IMAGE PICKUP APPARATUS HAVING THE SAME

(75) Inventor: Yuichiro Kato, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 52 days.

(21) Appl. No.: 12/843,128

(22) Filed: Jul. 26, 2010

(65) Prior Publication Data
US 2011/0026137 A1    Feb. 3, 2011

(30) Foreign Application Priority Data
Jul. 28, 2009   (JP) .................. 2009-175261

(51) Int. Cl.
*G02B 27/00*    (2006.01)
(52) U.S. Cl. ................ 359/700; 359/694; 359/817
(58) Field of Classification Search ........... 359/700, 359/817
See application file for complete search history.

(56) References Cited

U.S. PATENT DOCUMENTS
6,456,445  B2    9/2002  Nomura et al.
2001/0005288 A1*  6/2001  Hayashi et al. ............. 359/826
2001/0015860 A1*  8/2001  Nomura et al. ............. 359/701

FOREIGN PATENT DOCUMENTS
JP    3569478 B2    9/2004
* cited by examiner

*Primary Examiner* — Ricky Mack
*Assistant Examiner* — James Jones
(74) *Attorney, Agent, or Firm* — Rossi, Kimms & McDowell LLP (57) ABSTRACT

A lens apparatus of the present invention includes a cam ring 7 having an inner circumferential surface on which first, second, and third cam groove portions 7a, 7b, and 7c with which first, second, and third cam followers 25, 26, and 6 provided on first, second, and third lens holding members 1, 2, and 3 engage. The cam ring introduces the first and second cam followers from an insertion opening 7d and includes an introducing groove portion 7b4 for introducing the third cam follower and a connecting groove portion 7a5. The third cam groove portion is divided at a middle of the introducing groove portion which connects the insertion opening with the second cam groove portion.

6 Claims, 10 Drawing Sheets

FIG. 12

LENS APPARATUS CAPABLE OF PERFORMING EXTENSION/RETRACTION OPERATION WITH RESPECT TO IMAGE PICKUP APPARATUS BODY AND IMAGE PICKUP APPARATUS HAVING THE SAME

BACKGROUND OF THE INVENTION

1. Field of the Invention

The present invention relates to a lens apparatus used for an image pickup apparatus such as a compact digital camera and capable of performing an extension/retraction operation with respect to an image pickup apparatus body, and more particularly to a lens apparatus which moves a plurality of lens holding members using a plurality of cam groove portions formed on a cam ring.

2. Description of the Related Art

As a lens apparatus as described above, there is a zoom lens barrel disclosed in Japanese Patent No. 3569478. The zoom lens barrel is, as described below, configured to make it easy to assemble the lens holding members onto the cam ring.

The zoom lens barrel includes first and second lens holding members and a cam ring having an inner circumferential surface on which first and second cam groove portions with which cam followers provided on the first and second lens holding members are formed. A first introducing groove portion which introduces a cam follower of the first lens holding member from a first insertion opening to the first cam groove portion is formed in the cam ring. Furthermore, a second introducing groove portion which introduces a cam follower of the second lens holding member from a second insertion opening provided on the end surface to the second cam groove portion is formed in the cam ring.

In assembling the zoom lens barrel, first of all, the cam follower of the first lens holding member is introduced to the first cam groove portion via the first insertion opening and the first introducing groove portion. After that, the cam ring is rotated, and then the cam follower of the second lens holding member is introduced to the second cam groove portion via the second insertion opening and the second introducing groove portion. In order to enable such an assembly, the end portion of the first cam groove portion and the second insertion opening are formed at the same position in a circumferential direction of the cam ring.

As described above, Japanese Patent No. 3569478 discloses a configuration for easily assembling two lens holding members on two cam groove portions (a plurality of cam groove portions are formed in the circumferential direction of the cam ring) which are formed in the cam ring.

However, when three cam groove portions are formed in the cam ring in order to move three lens holding members, three introducing groove portions which introduce the cam follower provided on each lens holding member from each insertion opening to each cam groove portion are also necessary. Therefore, in the configuration as disclosed in Japanese Patent No. 3569478, it is difficult to dispose three cam groove portions efficiently on an inner circumferential surface of the cam ring which has a space limitation.

BRIEF SUMMARY OF THE INVENTION

The present invention provides a lens apparatus capable of efficiently forming three cam groove portions for moving three lens holding members on a cam ring and an image pickup apparatus having the same.

A lens apparatus as one aspect of the present invention is capable of performing an extension/retraction operation with respect to an image pickup apparatus body and of performing a zoom operation in an extended state. The lens apparatus includes a first lens holding member, a second lens holding member, and a third lens holding member configured to hold respective lenses, and a cam ring having an inner circumferential surface on which a first cam groove portion, a second cam groove portion, and a third cam groove portion with which a first cam follower provided in the first lens holding member, a second cam follower provided in the second lens holding member, and a third cam follower provided in the third lens holding member engage respectively, and configured to rotate around an optical axis in the extension/retraction operation and the zoom operation to move the first, second, and third lens holding members in an optical axis direction. The cam ring includes an introducing groove portion configured to introduce the first and second cam followers from an insertion opening formed on an end surface of the optical axis direction of the cam ring to the second cam groove portion, and to introduce the third cam follower from the insertion opening to the third cam groove portion, and a connecting groove portion connecting the first cam groove portion with the second cam groove portion and configured to introduce the first cam follower introduced from the introducing groove portion to the second cam groove portion from the second cam groove portion to the first cam groove portion. The third cam groove portion is formed so as to be divided at a middle of the introducing groove portion which connects the insertion opening with the second cam groove portion.

An image pickup apparatus including the lens apparatus and an image pickup apparatus body configured to take an object image formed by the lens apparatus also constitutes another aspect of the present invention.

Further features and aspects of the present invention will become apparent from the following description of exemplary embodiments with reference to the attached drawings.

DETAILED DESCRIPTION OF THE PREFERRED EMBODIMENTS

Exemplary embodiments of the present invention will be described below with reference to the accompanied drawings.

Figure 1:
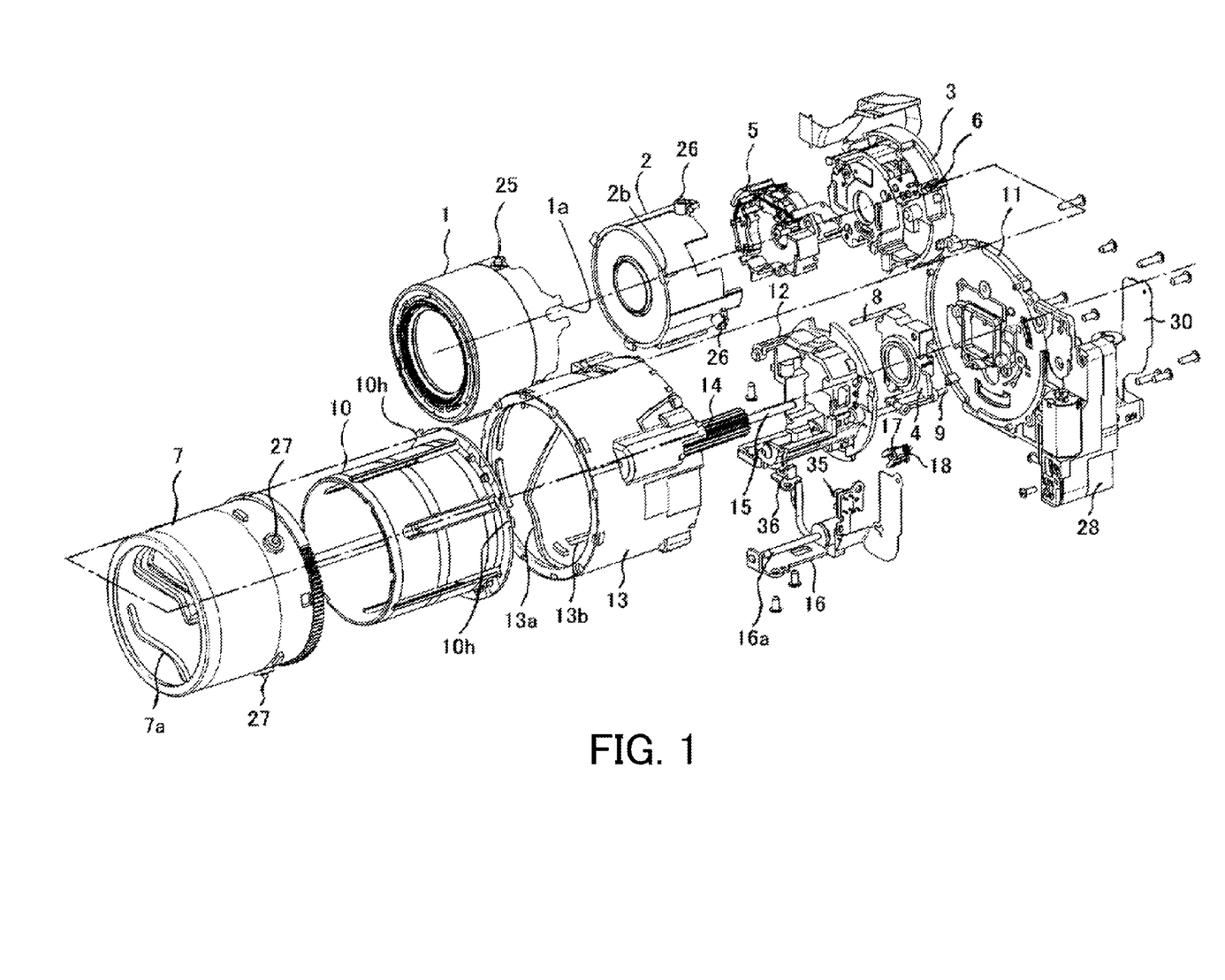
FIG. 1 is an exploded perspective view of a lens barrel that is an embodiment of the present invention.

FIG. 1 illustrates an exploded perspective view of a lens barrel (a lens apparatus) included in a camera (an image pickup apparatus) that is an embodiment of the present invention. The lens barrel of the present embodiment is included in a camera body (an image pickup apparatus body) 100 illustrated in FIGS. 2 and 3, and performs an extension/retraction operation between an extended state where the lens barrel is extended and a retracted state where the lens barrel is retracted in the camera body 100. The lens barrel also performs a zoom operation in the extended state. The camera body 100 includes an electronic circuit for performing a photoelectric conversion of an object image formed by the lens barrel by using an image pickup element described below to generate image data of the object.

Figure 2:
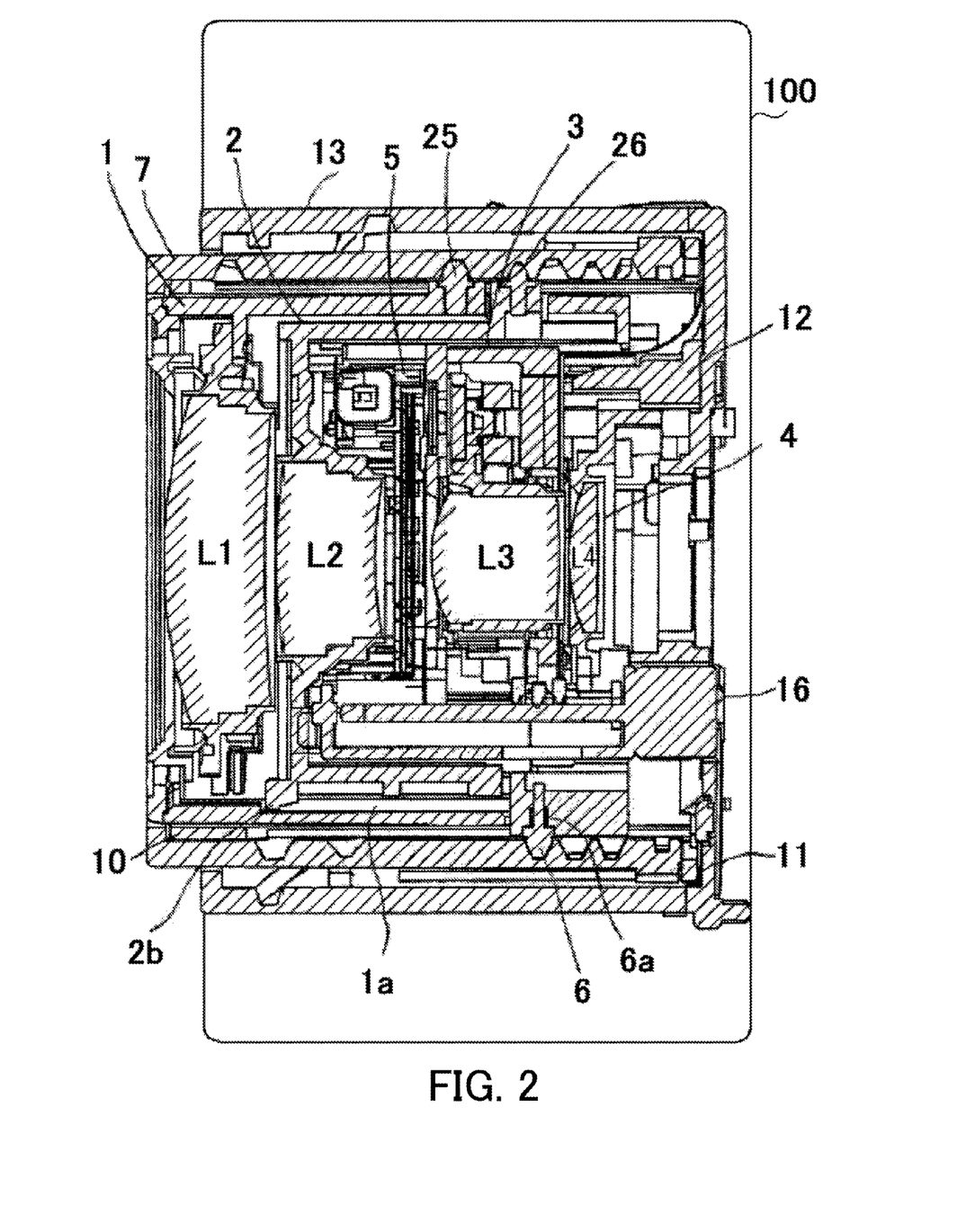
FIG. 2 is a cross-sectional view of a lens barrel in a retracted state in the embodiment.
Figure 3:
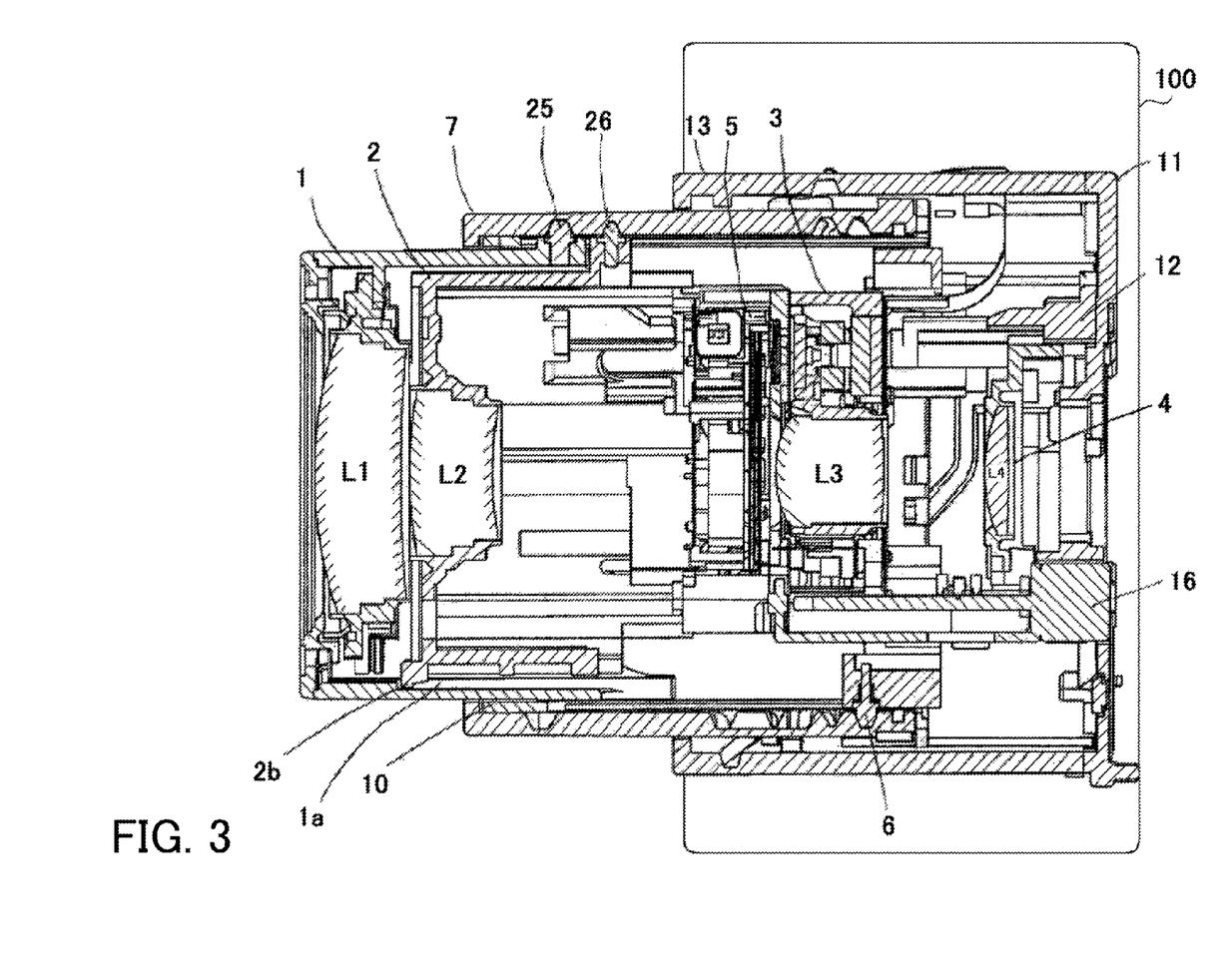
FIG. 3 is a cross-sectional view of a lens barrel in a wide-angle (WIDE) end state in the embodiment.
Figure 4:
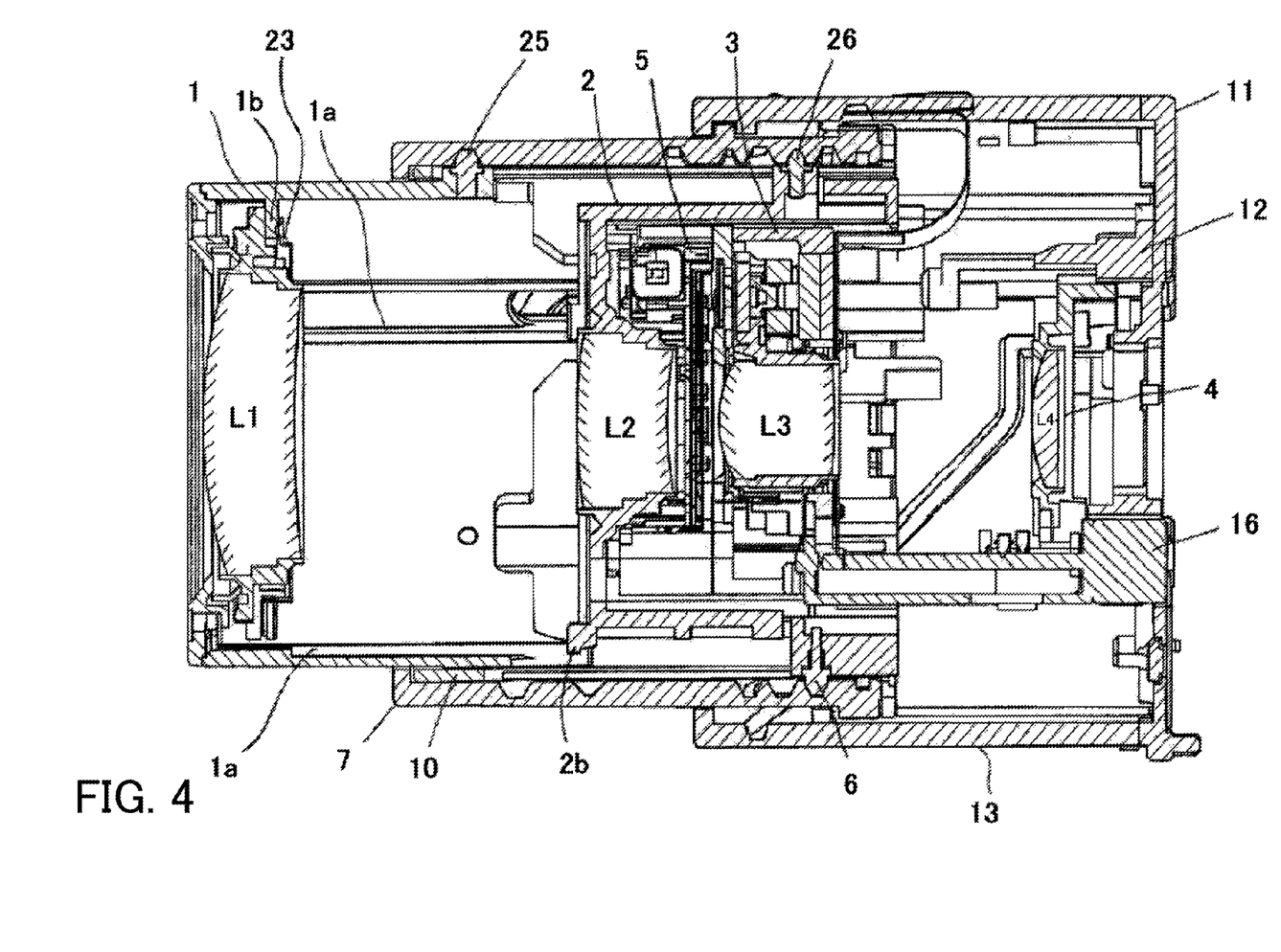
FIG. 4 is a cross-sectional view of a lens barrel in a telephoto (TELE) end state in the embodiment.

FIGS. 2, 3, and 4 illustrate cross-sectional configurations of the lens barrel in the retracted state, the wide-angle (WIDE) state, and the telephoto (TELE) state, respectively. In addition, FIGS. 5 to 12 illustrate partial configurations of the lens barrel in the present embodiment.

In these drawings, L1 denotes a first lens unit, L2 denotes a second lens unit, L3 denotes a third lens unit which moves in a plane orthogonal to an optical axis to perform an image-shake correction operation (an anti-shake operation), and L4 denotes a fourth lens unit which moves in an optical axis direction to perform a focusing operation.

Reference numeral 1 denotes a first barrel as a first lens holding member which holds the first lens unit L1, and reference numeral 2 denotes a second lens barrel as a second lens holding member which holds the second lens unit L2. Reference numeral 3 denotes a shift unit as a third lens holding member which holds the third lens unit L3 so as to be able to move (shift) in a plane orthogonal to the optical axis. Reference numeral 4 denotes a fourth lens holding frame which holds the fourth lens unit L4, and reference numeral 5 denotes a stop/shutter unit which adjusts light intensity.

Reference numeral 6 denotes a shift unit cam pin as a third cam follower having a conic shape which is fixed at a rear end portion of the shift unit 3 by press fitting, adhesion, or the like. The three shift unit cam pins 6 are provided in a circumferential direction of the shift unit 3.

Each of reference numerals 8 and 9 is a guide bar which guides the movement of the fourth lens holding frame 4 in the optical axis direction. Reference numeral 11 denotes an image pickup element holder which positions and fixes the rear end portions of the guide bars 8 and 9 and also holds the image pickup element (not shown) such as a CCD sensor or a CMOS sensor. Reference numeral 12 denotes a rear barrel which positions and fixes front end portions of the guide bars 8 and 9, and is connected with the image pickup element holder 11 by a screw.

Reference numeral 16 denotes a focus motor that is a drive source moving the fourth lens holding frame 4 in the optical axis direction. An output axis of the focus motor 16 is formed as a lead screw 16a, and a rack 17 which is attached to the fourth lens holding frame 4 is screwed into the lead screw 16a. When the lead screw 16a is rotated by the focus motor 16, the fourth lens holding frame 4 is driven in the optical axis direction via the rack 17. The focus motor 16 is fixed on the rear barrel 12 via a screw.

Reference numeral 18 denotes a rack spring for eliminating backlash between the fourth lens holding frame 4 and the rack 17. Reference numeral 35 denotes a photo interrupter which detects an initial position of the fourth lens holding frame 4, and a light shielding portion formed in the fourth lens holding frame 4 gets between a light emitting portion and a light receiving portion of the photo interrupter 35 to detect the initial position.

Figure 9:
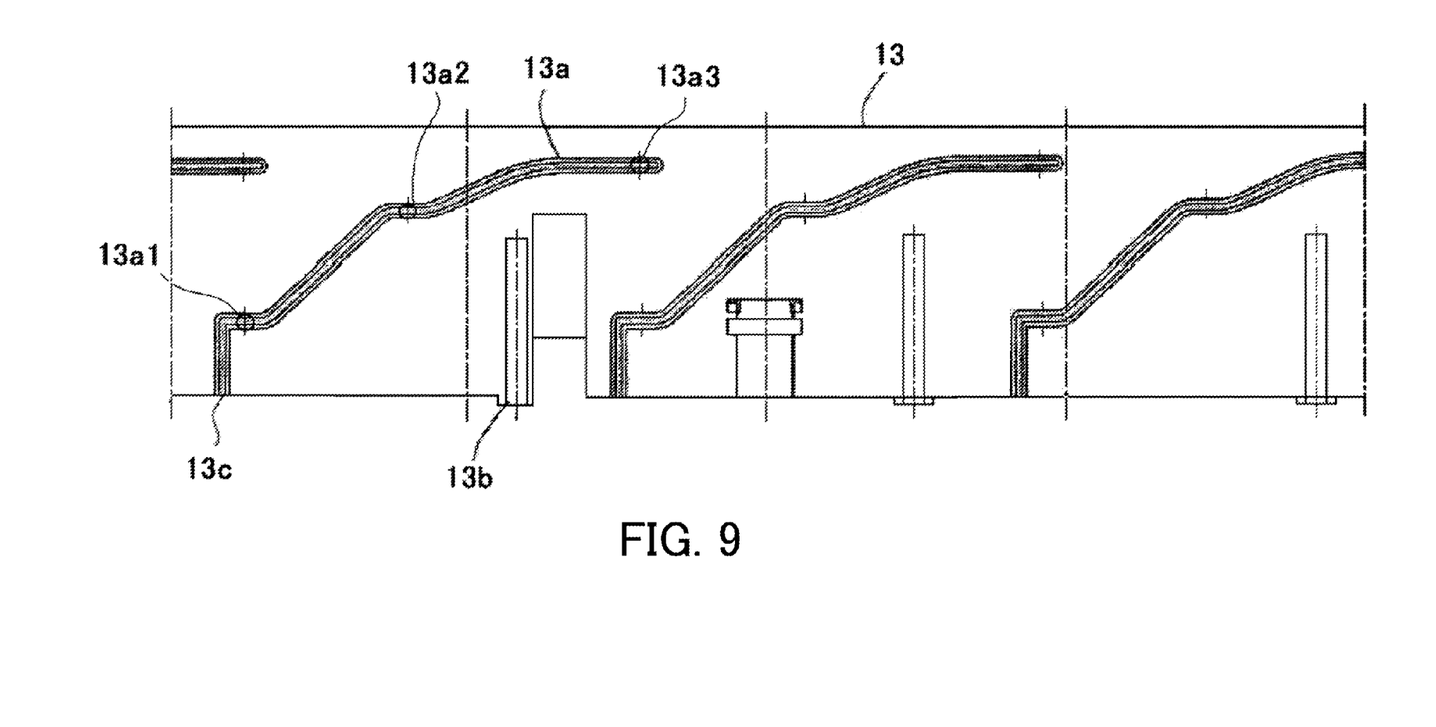
FIG. 9 is a development view of a fixed cam ring used as a lens barrel in the embodiment.

Reference numeral 13 denotes a fixed cam ring, and as illustrated in FIG. 9, three cam groove portions 13a to move a movable cam ring 7 in the optical axis direction are formed on its inner circumferential surface. Additionally, three guide groove portions 13b which engage with keys 10h provided on a guide barrel 10 as a straight guide ring to perform a decentered positioning with respect to the optical axis of the guide barrel 10 and a straight guidance on the inner circumferential surface of the fixed cam ring 13. The fixed cam ring 13 is fixed on the image pickup element holder 11 by a screw.

Figure 7:
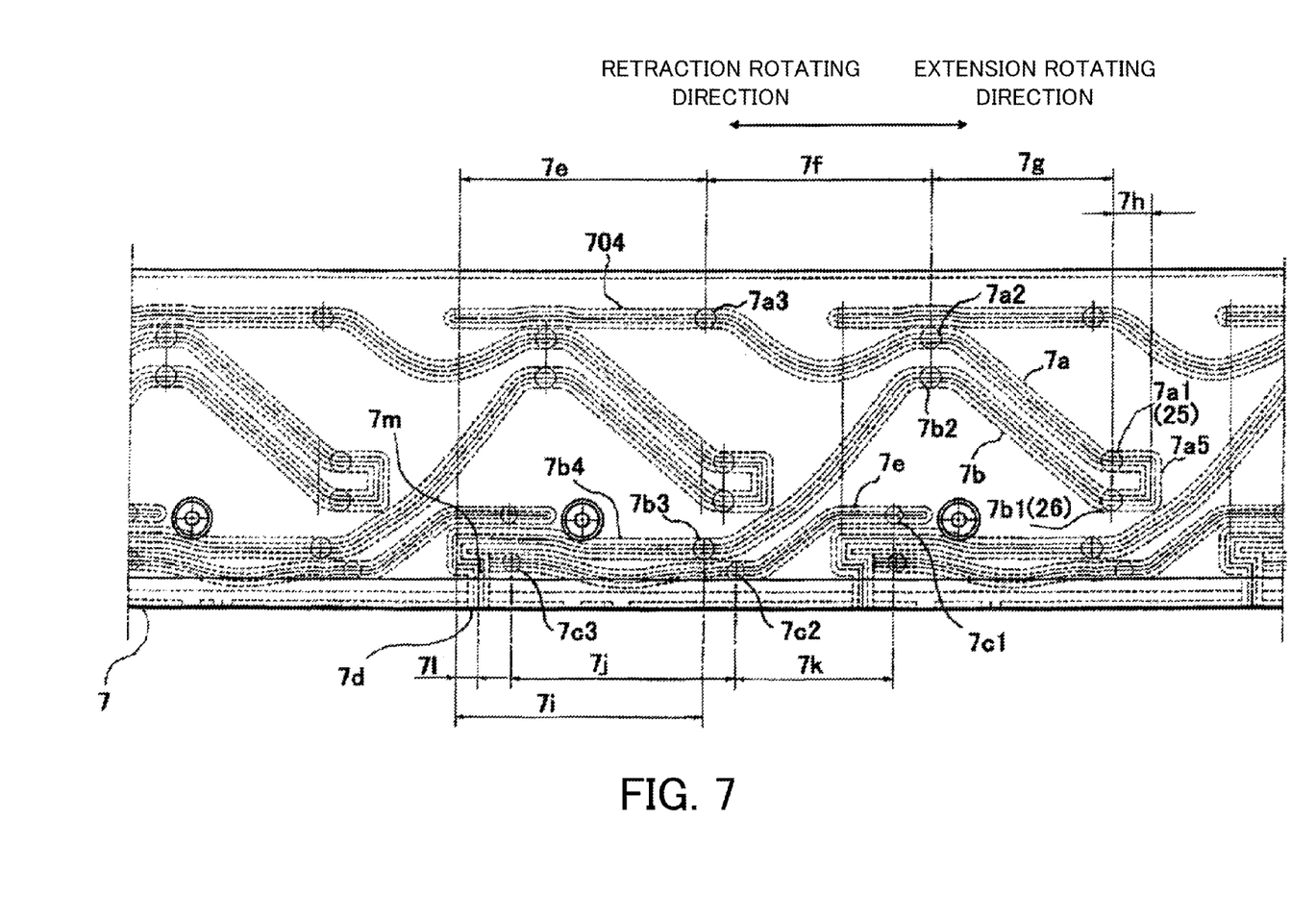
FIG. 7 is a development view of a movable cam ring used as a lens barrel in the embodiment.

Reference numeral 7 denotes a movable cam ring, and as illustrated in FIG. 7, three first cam groove portions 7a, three second cam groove portions 7b, and three third cam groove portions 7c to move the first barrel 1, the second barrel 2, and the shift unit 3 respectively in the optical axis direction are formed on its inner circumferential surface. The first to third cam groove portions 7a to 7c have cam shapes (cam trajectories) different from each other. The movable cam ring 7 is connected with the guide barrel 10 so as to be rotatable around the optical axis in a state where the movement in the optical axis direction is prevented by the bayonet structure. Therefore, the movable cam ring 7 moves in the optical axis direction with respect to the fixed cam ring 13 integrally with the guide barrel 10 while rotating around the optical axis.

Reference numeral 14 denotes a cylinder gear, which is elongated in the optical axis direction so as to be able to be always screwed into a gear portion formed on the movable cam ring 7 which is movable in the optical axis direction. The cylinder gear 14 rotates around a fixed position of a gear shaft 15 held between the fixed cam ring 13 and the image pickup element holder 11 as a shaft.

Reference numeral 28 denotes a zoom motor unit, which is fixed on the image pickup element holder 11 by a screw. An output gear (not shown) provided in the zoom motor unit 28 is screwed into the cylinder gear 14. Thus, a torque from the zoom motor unit 28 is transferred to the movable cam ring 7 via the cylinder gear 14 to be able to rotate this.

Figure 5:
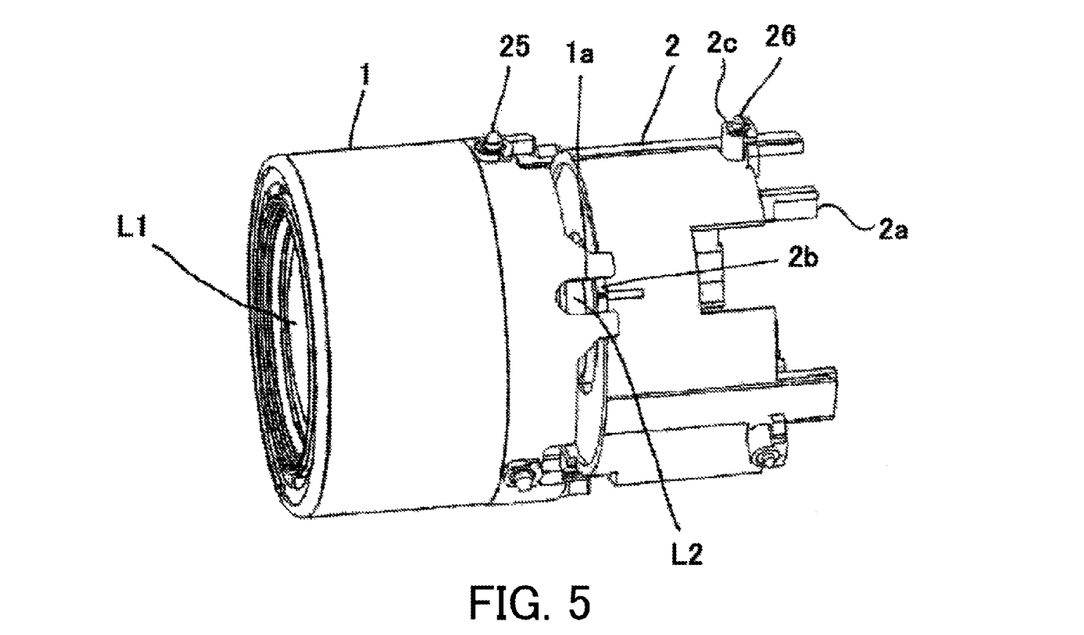
FIG. 5 is a perspective view of a first barrel and a second barrel of a lens barrel at a TELE end in the embodiment.

Reference numeral 36 denotes a photo interrupter which detects an initial position of the second barrel 2, and as illustrated in FIG. 5, a light shielding portion 2a formed on the second barrel 2 gets between a light emitting portion and a light receiving portion of the photo interrupter 36 to detect the initial position.

Three cam pins 27 provided on the movable cam ring 7 in a circumferential direction engage with the three cam groove portions 13a in the fixed cam ring 13. Three cam pins 25 as a first cam follower which are provided on the first barrel 1 in the circumferential direction engage with the three first cam groove portions 7a in the movable cam ring 7. Three second cam pins 26 as a second cam follower which are provided on the second barrel 2 in the circumferential direction engage with the three second cam groove portions 7b. Furthermore, three shift unit cam pins 6 which are provided on the shift unit in the circumferential direction engage with the three third cam groove portions 7c. The movable cam ring 7 moves in the optical axis direction while rotating around the optical axis to move the first barrel 1, the second barrel 2, and the shift unit 3 in the optical axis direction. Thus, the lens barrel performs a zoom operation along with performing the extension/retraction operation with respect to the camera body.

Figure 10:
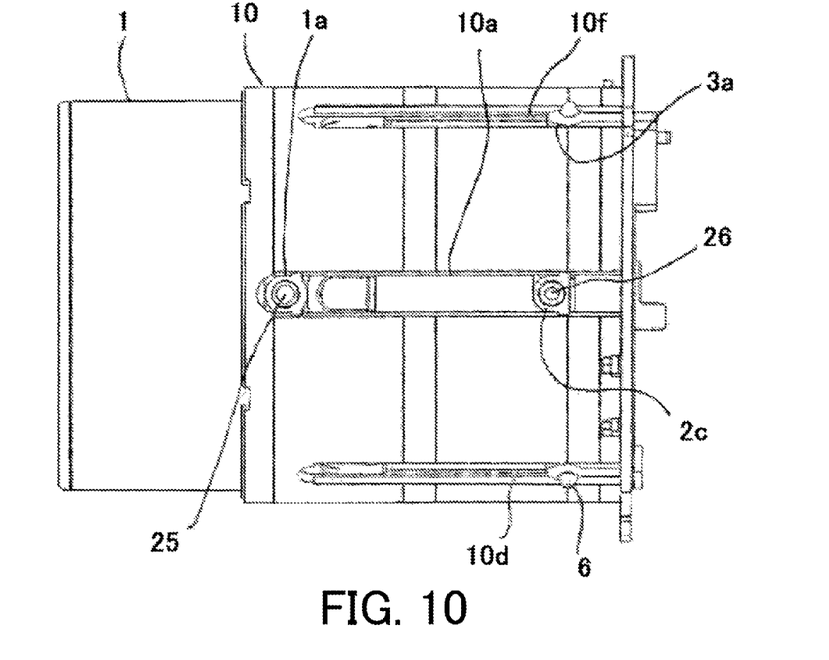
FIG. 10 is a view illustrating a support structure of a first barrel and a second barrel by a guide barrel used as a lens barrel in the embodiment.

Next, referring to FIG. 10, supporting structures of the first barrel 1, the second barrel 2, and the shift unit 3 will be described.

Figure 8:
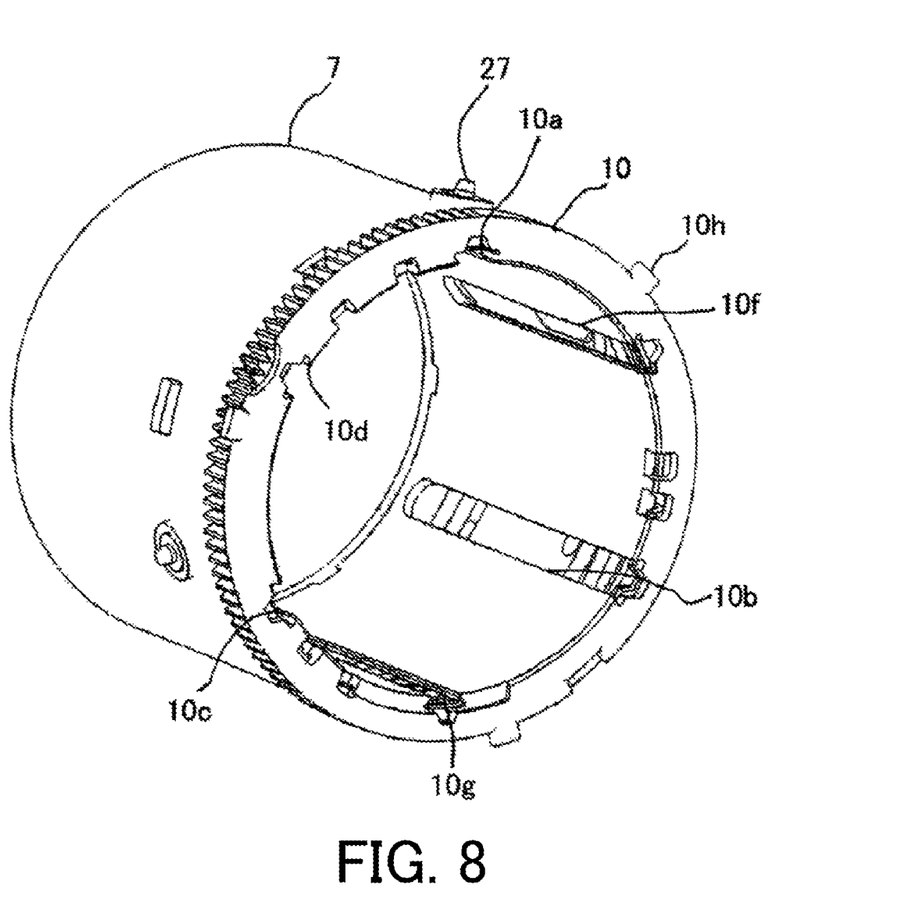
FIG. 8 is a perspective view of a movable cam ring and a guide barrel used as a lens barrel in the embodiment.

The three first cam pins 25 disposed near the rear end of the first barrel 1, as illustrated in FIG. 8, penetrate the guide groove portions 10a, 10b, and 10c formed on the guide barrel 10 so as to extend in the optical axis direction at intervals of 120° in the circumferential direction and engage with the first cam groove portions 7a of the movable cam ring 7.

Three guide keys 1c disposed near the rear end of the first barrel 1 at intervals of 120° in the circumferential direction engage with the guide groove portions 10a, 10b, and 10c to determine a decentered position of the first barrel 1 with respect to the guide barrel 10. Furthermore, three guide keys 2c disposed near the rear end of the second barrel 2 at intervals of 120° in the circumferential direction engage with the guide groove portions 10a, 10b, and 10c to determine a decentered position of the second barrel 2 with respect to the guide barrel 10. Thus, the first barrel 1 and the second barrel 2 are positioned by the same guide groove portions 10a, 10b, and 10c formed in the guide barrel 10, and therefore the decentering accuracies of both the first barrel 1 and the second barrel 2 with respect to the optical axis are improved.

Three guide keys 3a formed in the shift unit 3, as illustrated in FIG. 8, engage with guide groove portions 10d, 10f, and 10g formed in the guide barrel 10 which extend in the optical axis direction at intervals of 120° in the circumferential direction. Thus, the decentered position of the shift unit 3 with respect to the guide barrel 10 is determined. The guide groove portions 10d, 10f, and 10g are formed at positions having phases different by 60° from those of the guide groove portions 10a, 10b, and 10c, respectively.

The three first cam pins 25 are made of metal, and are fixed on the first barrel 1 by the press fitting or the adhesion. However, each of the first cam pins 25 may be integrally formed in the first barrel 1 and the second barrel 2.

Two of the three shift unit cam pins 6 are formed integrally with the shift unit 3. The other one of the shift unit cam pins 6 is, as illustrated in FIG. 2, formed as a member different from that of the shift unit 3, and is biased to the third cam groove portion 7c by a coil spring 6a. Thus, the engagement backlash of the three shift unit cam pins 6 with respect to the three third cam groove portions 7c can be eliminated.

Two of the three second cam pins 26 are made of metal, and are fixed on the second barrel 2 by the press fitting or the adhesion. The other one of the second cam pins 26 is formed as a member different from that of the second barrel 2, and biased to the second cam groove portion 7b by a coil spring (not shown). Thus, the engagement backlash of the three second cam pins 26 with respect to the three second cam groove portions 7b can be eliminated.

As illustrated in FIGS. 2 to 5, the three guide groove portions 1a extending in the optical axis direction at intervals of 120° in the circumferential direction are formed near the rear end of the first barrel 1. The three keys 2b formed at intervals of 120° in the circumferential direction near the front end of the second barrel 2 engage with the guide groove portions 1a. Thus, an optical axis position of the first barrel 1 and an optical axis position of the second barrel 2 are aligned.

Three guide groove portions 2d extending in the optical axis direction at intervals of 120° in the circumferential direction are also formed on an inner circumferential surface of the second barrel 2. Keys 3b formed on a front end of the shift unit 3 at intervals of 120° in the circumferential direction engage with the guide groove portions 2d. Thus, an optical axis position of the second barrel 2 and an optical axis position of the shift unit 3 are aligned. The configuration of aligning the optical axis positions by engaging these keys with the guide groove portions always functions in the extended state and the retracted state from the WIDE end to the TELE end.

According to the above configuration, the first barrel 1, the second barrel 2, and the shift unit 3 are moved in the optical axis direction by the first, second, and third cam groove portions 7a, 7b, and 7c which are formed on the inner circumferential surface of the rotating movable cam ring 7 in a state where the rotations around the optical axis are prevented by the guide barrel 10.

Figure 6:
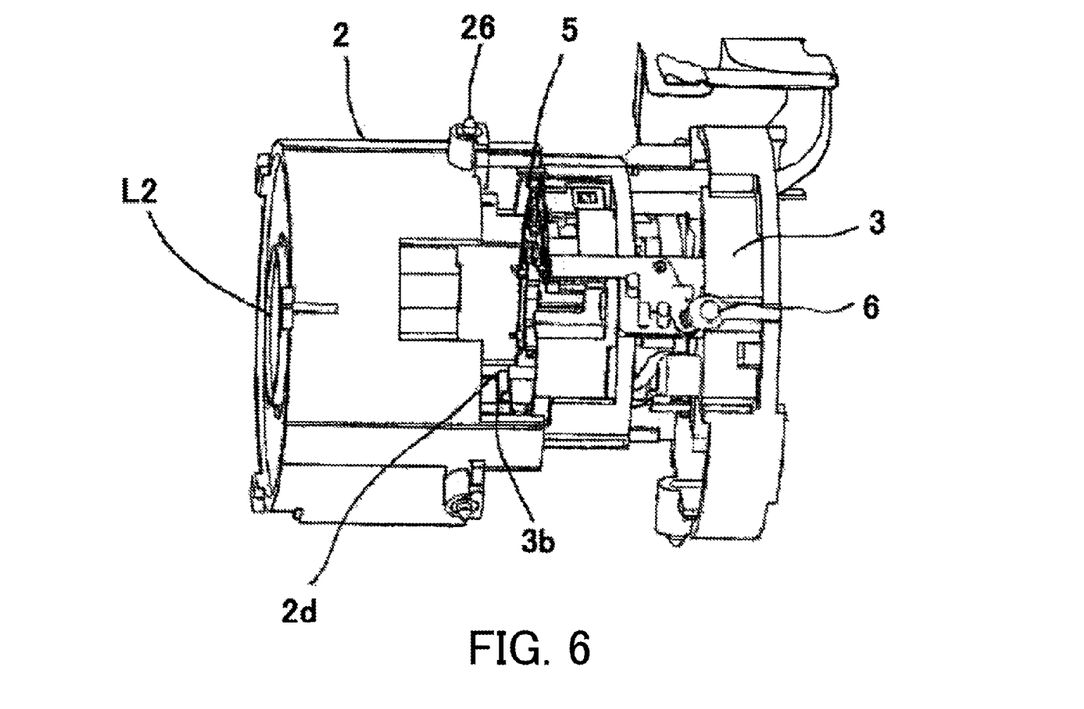
FIG. 6 is a perspective view of a second barrel and a shift unit of a lens barrel at a WIDE end in the embodiment.
Figure 11:
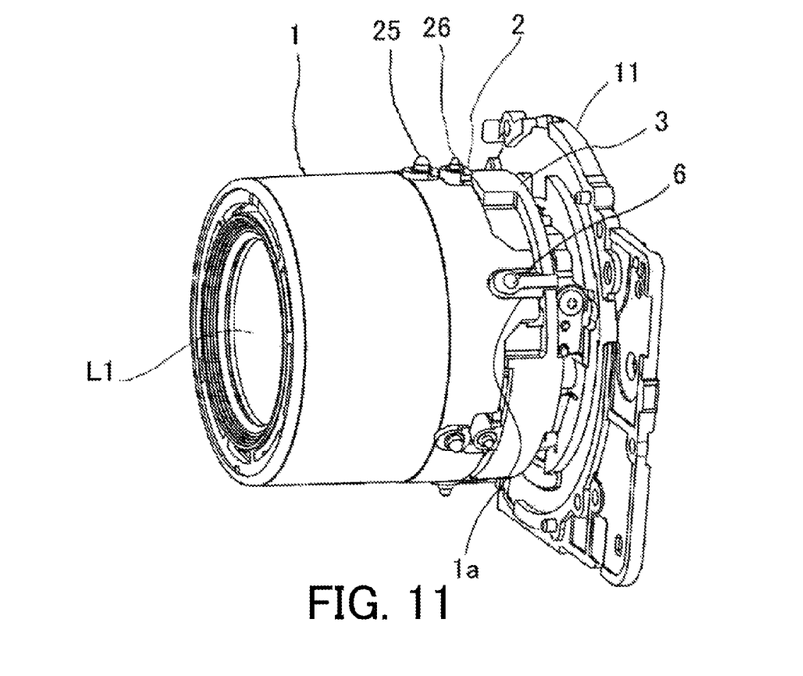
FIG. 11 is a perspective view illustrating a first barrel and a shift unit of a lens barrel in a retracted state in the embodiment.

FIG. 11 illustrates the first barrel 1, the second barrel 2, and the shift unit 3 in the retracted state. When the movable cam ring 7 in the WIDE end state illustrated in FIG. 6 is rotated by the retraction operation, the first and second barrels 1 and 2 move in the optical axis direction along the guide groove portions 10a, 10b, and 10c illustrated in FIG. 8. The shift unit 3 moves in the optical axis direction along the guide groove portions 10d, 10f, and 10g. When the lens barrel reaches the retracted state illustrated in FIG. 11, the shift unit cam pin 6 gets into the guide groove portion 1a which is formed in the first barrel 1. The key 2b of the second barrel 2 always engages with the guide groove portion 1a. Therefore, the guide groove portion 1a, the key 2b provided in the second barrel 2, and the shift unit cam pin 6 are arranged at the same phase in the circumferential direction.

The guide groove portion 1a engages with the key 2b of the second barrel 2 to function as a relative decentered positioning between the first barrel 1 and the second barrel 2. The function of the decentered positioning is realized by using the width of the guide groove portion 1a in the circumferential direction, and the function of the decentered positioning is not damaged even if the first barrel 1 is cut out to be formed so as to see the guide groove portion 1a from the outside.

Even in the retracted state, the guide groove portion 1a engages with the key 2b. However, the key 2b is moved to the object side in the guide groove portion 1a. Therefore, even if the shift unit cam pin 6 gets into the guide groove portion 1a in the retracted state, the key 2b is not interfered.

Figure 12:
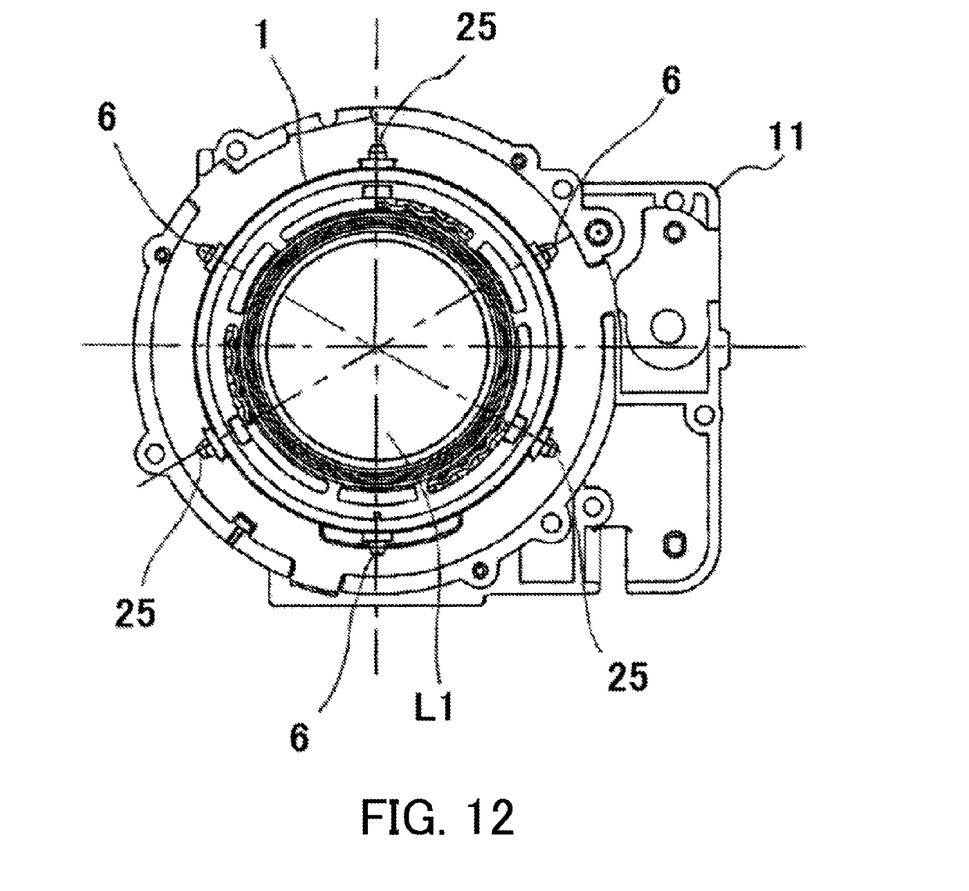
FIG. 12 is an elevation view illustrating a first barrel and a shift unit of a lens barrel in the embodiment.

As illustrated in FIG. 7, the first cam pins 25 provided in the first barrel 1 and the second cam pins 26 provided in the second barrel 2 are disposed at positions having the same phase each other in the circumferential direction. On the other hand, as illustrated in FIGS. 7 and 12, the first and second cam pins 25 and 26 provided in the first barrel 1 and the second barrel 2 are disposed at positions where phases are displaced by 60° from those of positions of the shift unit cam pins 6. This is due to the arrangements of the first, second, and third cam groove portions 7a, 7b, and 7c in the movable cam ring 7 illustrated in FIG. 7. In other words, the cam groove portion 7c used for the shift unit 3 is disposed at a phase different from those of the cam groove portions 7a and 7b used for the first barrel 1 and the second barrel 2 to efficiently use an area of the inner circumferential surface of the movable cam ring 7 and to have an advantage of suppressing the length of the movable cam ring 7 in the optical axis direction.

Next, referring to FIGS. 7 and 9, the shapes (the trajectories) of the first, second, and third cam groove portions 7a, 7b, and 7c formed on the inner circumferential surface of the movable cam ring 7 and the shape of the cam groove portion 13a formed on the inner circumferential surface of the fixed cam ring 13 will be described.

In FIG. 7, the leftward direction is a rotation direction of the movable cam ring 7 at a zoom operation from the TELE side to the WIDE side and at a retraction operation (hereinafter, referred to as a retraction rotating direction). The rightward direction is a rotation direction of the movable cam ring 7 at an extension operation and at a zoom operation from the WIDE side to the TELE side (hereinafter, referred to as an extension rotating direction).

First of all, referring to FIG. 9, the shape of the cam groove portion 13a which is formed on the inner circumferential surface of the fixed cam ring 13 will be described. As described above, the cam pins 27 provided at three areas at intervals of 120° in the circumferential direction engage with the cam groove portions 13a of the fixed cam ring 13. The movable cam ring 7 rotates in the extension rotating direction from the retracted state to move forward from a retracted position 13a1 to a TELE end position 13a3 via a WIDE end position 13a2. The cam groove portion 13a has a flat cam shape (parallel to the circumferential direction) near the retracted position 13a1, the WIDE end position 13a2, and the TELE end position 13a3.

In FIG. 7, the first cam pins 25 provided at three areas of the first barrel 1 at intervals of 120° in the circumferential direction engage with the first cam groove portions 7a of the movable cam ring 7. The first barrel 1 rotates in the extension rotating direction from the retracted state to monotonically move forward in an object side direction from a retracted position 7a1 to a WIDE end position 7a2. After the first barrel 1 moves backward in an image plane side direction from the WIDE end position 7a2 to a TELE end position 7a3 a little bit, it moves forward in the object side direction with reference to the WIDE end position 7a2 to reach the TELE end position 7a3. At this time, because the movable cam ring 7 itself also moves forward with respect to the fixed cam ring 13, the first barrel 1 moves to a position depending upon an integrated travel distance of a travel distance of the movable cam ring 7 by the cam groove portion 13a and a travel distance of the first barrel 1 by the first cam groove portion 7a.

An interval 7g of the first cam groove portion 7a indicates a retraction area in which the first barrel 1 is moved between the retracted position 7a1 and the WIDE end position 7a2, and an interval 7f indicates a zoom area in which the first barrel 1 is moved between the WIDE end position 7a2 and the TELE end position 7a3. The first cam groove portion 7a has a flat cam shape near the retracted position 7a1, the WIDE end position 7a2, and the TELE end position 7a3.

An extending groove portion 7a4 formed so as to substantially flatly extend in an interval 7e that is located in the TELE direction relative to the interval 7f is connected with the TELE side end portion of the first cam groove portion 7a. The extending groove portion 7a4 is a groove portion which is formed to introduce (clear) the first cam pin 25 when the second barrel 2 is assembled after the first barrel 1 has been assembled with respect to the movable cam ring 7. In other words, the first cam pin 25 is introduced to the extending groove portion 7a4 in assembling the lens barrel, but the first cam pins 25 do not engage in the zoom operation or the extension/retraction operation.

A connecting groove portion 7a5 which connects a retraction side end portion of the first cam groove portion 7a with a retraction side end portion of the second cam groove portion 7b is formed in an interval 7h in the retraction rotating direction relative to the retraction side end portion of the first cam groove portion 7a. The extending groove portion 7a4 described above is a groove portion which is connected with a side opposite to that of the connecting groove portion 7a (the connecting groove portion side) of the first cam groove portion 7a in the circumferential direction. The connecting groove portion 7a5 is a groove portion which is formed to introduce the first cam pin 25 introduced from an introducing groove portion described below to the second cam groove portion 7b from the second cam groove portion 7b to the first cam groove portion 7a. The first cam pin 25 is introduced to (pass through) the connecting groove portion 7a5 in assembling the lens barrel, but the first cam pin 25 does not engage with the second cam pin 26 of the second barrel 2 in the zoom operation or the extension/retraction operation.

The second cam pins 26 provided on three areas of the second barrel 2 at intervals of 120° in the circumferential direction engage with the second cam groove portions 7a of the movable cam ring 7. The second barrel 2 monotonically moves forward from a retracted position 7b1 to a WIDE end position 7b2 and also monotonically moves backward from the WIDE end position 7b2 to a TELE end position 7b3 by the movable cam ring rotating in the extension rotating direction from the retracted state. At this time, because the movable cam ring 7 itself moves forward with respect to the fixed cam ring 13, the second barrel 2 moves to a position depending upon an integrated travel distance of a travel distance of the movable cam ring 7 by the cam groove portion 13a and a travel distance of the second barrel 2 by the second cam groove portion 7b.

An interval 7g of the second cam groove portion 7b indicates a retraction area in which the second barrel 2 is moved between the retracted position 7b1 and the WIDE end position 7b2, and an interval 7f indicates a zoom area in which the second barrel 2 is moved between the WIDE end position 7b2 and the TELE end position 7b3. The second cam groove portion 7b has a flat cam shape near the retracted position 7b1, the WIDE end position 7b2, and the TELE end position 7b3.

An introducing groove portion 7b4 which is connected with a TELE side end portion of the second cam groove portion 7b is formed in an interval 7i in the retraction rotating direction relative to the TELE side end portion of the second cam groove portion 7b. The introducing groove portion 7b4 is formed in order to introduce the first and second cam pins 25 and 26 (the first and second barrels 1 and 2) in this order from an insertion opening 7d which opens on an end surface in the optical axis direction of the movable cam ring 7 (a bottom end surface in FIG. 7) to the second cam groove portion 7b.

The shift unit cam pins 6 provided on three areas of the shift unit 3 at intervals of 120° in the circumferential direction engage with the third cam groove portions 7c of the movable cam ring 7. The shift unit 3 moves backward from the retracted position 7c1 to the WIDE end position 7c2 by rotating the movable cam ring 7 in the extension rotating direction from the retracted state. Then, after the shift unit 3 additionally moves backward from the WIDE end position 7c2 to the TELE end position 7c3 a little bit, it moves forward with reference to the WIDE end position 7c2 to reach the TELE end position 7c3. At this time, since the movable cam ring 7 itself also moves forward with reference to the fixed cam ring 13, the shift unit 3 moves to a position depending upon the integrated travel distance of the travel distance of the movable cam ring 7 by the cam groove portion 13a and the travel distance of the shift unit 3 by the third cam groove portion 7c.

The TELE side end portion of the third cam groove portion 7c is connected with a branch position (an intermediate position) 7m of the introducing groove portion 7b4 which connects the insertion opening 7d described above with the second cam groove portion 7b. In other words, the third cam groove portion 7c is formed so as to be divided at the middle of the introducing groove portion 7b4. The shift unit cam pins 6 are introduced from the insertion opening 7d up to the branch position (the intermediate position) 7m of the introducing groove portion 7b4 before being introduced to the third cam groove portion 7c.

Next, a procedure of assembling the first barrel 1, the second barrel 2, and the shift unit 3 with respect to the movable cam ring 7 will be described.

First of all, the first cam pin 25 provided on the first barrel 1 is introduced from the insertion opening 7d to the introducing groove portion 7b4, and is introduced to the first cam groove portion 7a via the second cam groove portion 7b and the connecting groove portion 7a5. Next, the second cam pin 26 provided on the second barrel 2 is introduced from the insertion opening 7d to the introducing groove portion 7b4.

At this time, since both the first cam pin 25 and the second cam pin 26 are introduced to the same guide groove portions 10a, 10b, and 10c in the guide barrel 10, the first cam pin 25 needs to be positioned at the same phase as that of the insertion opening 7d. Therefore, the first cam pin 25 is introduced from the cam groove portion 7a to the extending groove portion 7a4. Then, the second cam pin 26 is introduced from the introducing groove portion 7b4 to the second cam groove portion 7b. The second cam pin 26 is disposed at the same phase as that of the first cam pin 25.

Next, the shift unit cam pin 6 provided on the shift unit 3 is introduced from the insertion opening 7d to the introducing groove portion 7b4. At this time, the shift unit cam pin 6 is also introduced to the guide groove portions 10d, 10f, and 10g formed at phases different from those of the guide groove portions 10a, 10b, and 10c in the guide barrel 10. Then, the shift unit cam pin 6 is introduced from the branch position 7m of the introducing groove portion 7b4 to the third cam groove portion 7c.

At this time, the introducing groove portion 7b4 formed so as to bend by 90° in the retraction rotating direction (a first direction) of the movable cam ring 7 at the branch position 7m, and the third cam groove portion 7c is formed so as to extend in the extension rotating direction (a second direction) opposite to the retraction rotating direction from the branch position 7m. Therefore, the shift unit cam pin 6 may be pushed on an end surface at the branch position 7m in a cam pin introducing direction to be introduced to the third cam groove portion 7c, and the shift unit 3 is easily introduced to the movable cam ring 7.

A portion connected with the second cam groove portion 7b from the branch position of the introducing groove portion 7b4 extends in the retraction rotating direction from the branch position before extending so as to bend in the extension rotating direction to reach the second cam groove portion 7b. Therefore, the extending groove portion is formed so as to extend at least up to the same phase as that of an end position of the introducing groove portion 7b4 in the retraction rotating direction and so that the second cam pin 26 can be disposed at the same phase as that of the first cam pin 25 in assembling the second barrel 2.

Thus, in the present embodiment, the first to third cam groove portions 7a to 7c can be efficiently formed on the inner circumferential surface of the movable cam ring 7 having only a limited area (space). In addition, the extending groove portion 7a4, the connecting groove portion 7a5, and the introducing groove portion 7b4 are formed to make it easy to assemble the first barrel 1, the second barrel 2, and the shift unit 3.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

In the above embodiment, the introducing groove portion is formed by being extended from the insertion opening in the retraction rotating direction of the movable cam ring before being extended so as to turn down in the extension rotating direction to be connected with the second cam groove portion. However, the shape of the introducing groove portion is not limited to this. For example, the introducing groove portion may also be formed by being extended from the insertion opening to the optical axis direction before being turned down in the extension rotating direction to be connected with the second cam groove portion. Also in this case, the third cam groove portion may be divided at the middle of the portion of the introducing groove portion extending in the optical axis direction.

The shapes of the first to third cam groove portions in the above embodiment is just one example, and it may be formed so as to have another shape. Furthermore, flat portions formed at the retracted position, the WIDE end position, and the TELE end position in the first to third cam groove portions are not necessarily provided.

In addition, the entire configuration of the lens barrel is just one example, and the present invention can also be applied to a lens barrel having another configuration including a cam ring which is at least rotatable.

According to the present embodiment, three cam groove portions for moving three lens holding members can be efficiently formed on a cam ring, and the size of a lens apparatus and an image pickup apparatus can be reduced.

This application claims the benefit of Japanese Patent Application No. 2009-175261, filed on Jul. 28, 2009, which is hereby incorporated by reference herein in its entirety.

What is claimed is:

1. A lens apparatus capable of performing an extension/retraction operation with respect to an image pickup apparatus body and of performing a zoom operation in an extended state, the lens apparatus comprising:

a first lens holding member, a second lens holding member, and a third lens holding member configured to hold respective lenses; and a cam ring having an inner circumferential surface on which a first cam groove portion, a second cam groove portion, and a third cam groove portion with which a first cam follower provided in the first lens holding member, a second cam follower provided in the second lens holding member, and a third cam follower provided in the third lens holding member engage respectively, and configured to rotate around an optical axis in the extension/retraction operation and the zoom operation to move the first, second, and third lens holding members in an optical axis direction, wherein the cam ring including:

an introducing groove portion configured to introduce the first and second cam followers from an insertion opening formed on an end surface of the optical axis direction of the cam ring to the second cam groove portion, and to introduce the third cam follower from the insertion opening to the third cam groove portion; and a connecting groove portion connecting the first cam groove portion with the second cam groove portion and configured to introduce the first cam follower introduced from the introducing groove portion to the second cam groove portion from the second cam groove portion to the first cam groove portion, and wherein the third cam groove portion is formed so as to be divided at a middle of the introducing groove portion which connects the insertion opening with the second cam groove portion.

2. A lens apparatus according to claim 1, wherein the introducing groove portion is formed so as to extend in a first direction of the circumferential direction of the cam ring from the insertion opening, and wherein the third cam groove portion is formed so as to extend in a second direction opposite to the first direction of the circumferential direction from the middle of the introducing groove portion.

3. A lens apparatus according to claim 2, wherein an extending groove portion is connected with a side opposite to that of the connecting groove portion in the first cam groove portion in a circumferential direction of the cam ring, configured not to engage with the first cam follower in the extension/retraction operation and the zoom operation, and configured to introduce the first cam follower when the second cam follower is introduced from the introducing groove portion to the second cam groove portion, and wherein the extending groove portion is formed so as to extend, in the first direction from the first cam groove portion, at least up to the same position as an end position in the first direction of the introducing groove portion.

4. An image pickup apparatus comprising:

a lens apparatus capable of performing an extension/retraction operation with respect to an image pickup apparatus body and of performing a zoom operation in an extended state; and the image pickup apparatus body configured to take an object image formed by the lens apparatus, wherein the lens apparatus comprises:

a first lens holding member, a second lens holding member, and a third lens holding member configured to hold respective lenses; and a cam ring having an inner circumferential surface on which a first cam groove portion, a second cam groove portion, and a third cam groove portion with which a first cam follower provided in the first lens holding member, a second cam follower provided in the second lens holding member, and a third cam follower provided in the third lens holding member engage respectively, and configured to rotate around an optical axis in the extension/retraction operation and the zoom operation to move the first, second, and third lens holding members in an optical axis direction, wherein the cam ring including:

an introducing groove portion configured to introduce the first and second cam followers from an insertion opening formed on an end surface of the optical axis direction of the cam ring to the second cam groove portion, and to introduce the third cam follower from the insertion opening to the third cam groove portion; and a connecting groove portion connecting the first cam groove portion with the second cam groove portion and configured to introduce the first cam follower introduced from the introducing groove portion to the second cam groove portion from the second cam groove portion to the first cam groove portion, and wherein the third cam groove portion is formed so as to be divided at a middle of the introducing groove portion which connects the insertion opening with the second cam groove portion.

5. An image pickup apparatus according to claim 4, wherein the introducing groove portion is formed so as to extend in a first direction of the circumferential direction of the cam ring from the insertion opening, and wherein the third cam groove portion is formed so as to extend in a second direction opposite to the first direction of the circumferential direction from the middle of the introducing groove portion.

6. An image pickup apparatus according to claim 5, wherein an extending groove portion is connected with a side opposite to that of the connecting groove portion in the first cam groove portion in a circumferential direction of the cam ring, configured not to engage with the first cam follower in the extension/retraction operation and the zoom operation, and configured to introduce the first cam follower when the second cam follower is introduced from the introducing groove portion to the second cam groove portion, and wherein the extending groove portion is formed so as to extend, in the first direction from the first cam groove portion, at least up to the same position as an end position in the first direction of the introducing groove portion.

* * * * *